March 6, 1951
M. J. VAVRA ET AL
2,543,997
SUPPORT
Filed Nov. 26, 1945
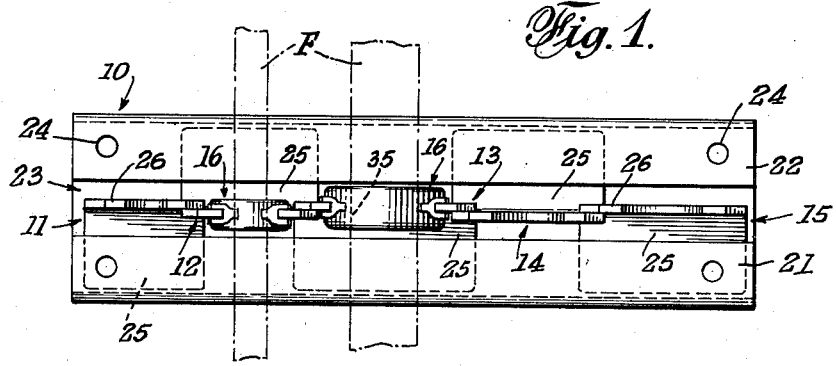
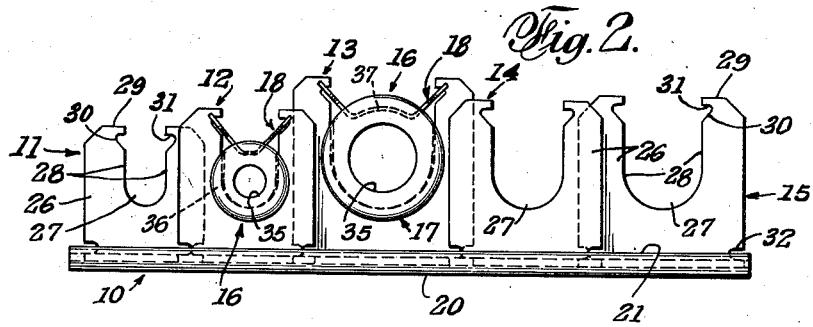
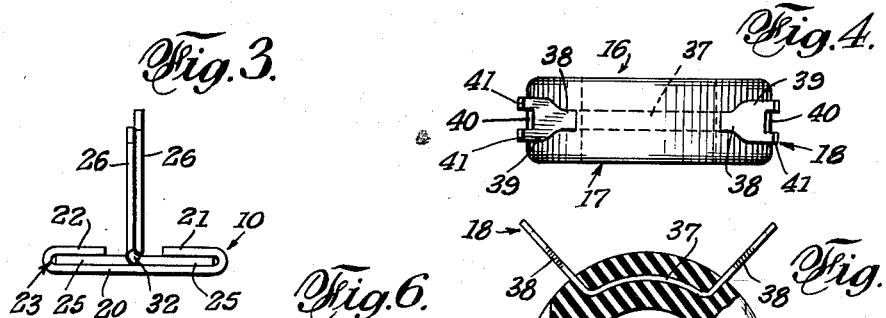
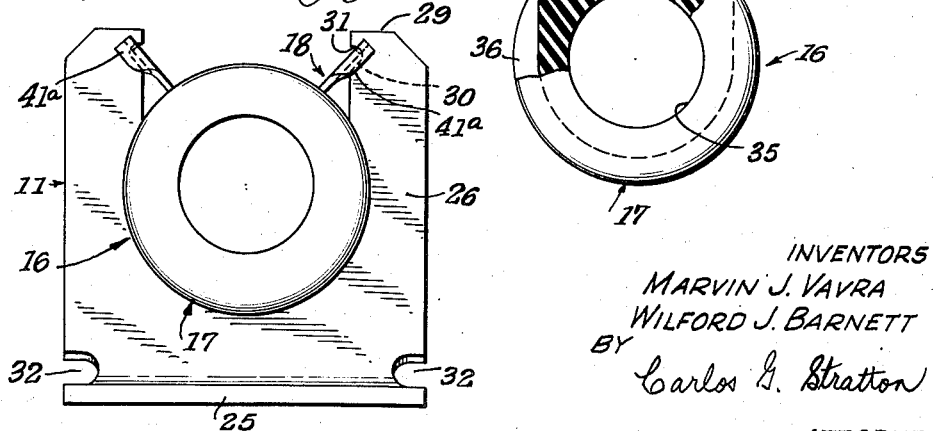
INVENTORS
MARVIN J. VAVRA
WILFORD J. BARNETT
BY
Carlos G. Stratton
ATTORNEY Patented Mar. 6, 1951

2,543,997

UNITED STATES PATENT OFFICE 2,543,997

SUPPORT

Marvin J. Vavra, West Los Angeles, and
Wilford J. Barnett, Venice, Calif.

Application November 26, 1945, Serial No. 630,846

2 Claims. (Cl. 248—68)

The present invention relates to fairlead structures and has for its object to provide a novel, simplified and efficient fairlead support and an improved associated grommet for facilitating the proper firm and vibrationless support of tubes, wires, cables and the like. This invention may be effectively employed in various fields of use and is particularly adapted to be used in aircraft for the intermediate support of cable controls, tubes, pipes, etc., extending through the various components of such structures.

Another object of this invention is to provide a fairlead structure which is flexible of application and which can readily be assembled and arranged according to special or individual requirements.

Another object of the invention is to provide a fairlead structure involving a plurality of separate variously sized support units arranged for interengaging support in a common base tube.

Another object of the invention is to provide an improved fairlead support element of simple and inexpensive form.

A further object of the invention is to provide an improved grommet embodying means which is releasable yet adapted to be firmly locked in place in a fairlead support or the like.

A further object of the invention is to provide a fairlead grommet incorporating in its structure spring means for releasably locking the grommet in a seat provided therefor in a fairlead support.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a top plan view of a fairlead structure embodying the present invention.

Fig. 2 is a front view thereof.

Fig. 3 is an end view of the fairlead support shown in Figs. 1 and 2.

Fig. 4 is an enlarged top edge view of a grommet according to the invention.

Fig. 5 is a front view thereof, partly in longitudinal section.

Fig. 6 is an enlarged front view of a grommet equipped fairlead support element embodying a variation in the structure.

The fairlead structure which is illustrated in the drawing embodies, generally, a fairlead support base 10; a fairlead support comprising a plurality of fairlead support elements 11, 12, 13, 14 and 15 carried by the support base 10; and a grommet 16 adapted to be removably yet firmly held by each support element. Each grommet 16 comprises, generally, a body 17 and spring clip 18 adapted for releasable engaging with its related support element.

As shown, the fairlead support base 10 comprises an elongated flattened generally tubular member having a bottom wall 20 and inwardly directed end-spaced integral upper walls 21 and 22 defining a channel 23. Formed in this manner, the base 10 has a flattened C-shaped cross section and may be of indeterminate length according to requirements. The support base may be secured in place on a support as by screws or the like, applied through holes 24.

The fairlead support elements 11 to 15, inclusive, as shown, may vary in size according to conditions and may be assembled on the support base 10 according to specific requirements. Each element is shown as comprising an angle-shaped unit having a foot 25 and a generally perpendicular wall 26, constituting a simple inexpensive unit.

The wall 26 of each element is formed with an open-ended slot forming a seat 27 receptive of one of the grommets 16. The lateral edge walls 28 of said seat 27 extend upwardly to the top edge 29 of the wall 26. Adjacent the top ends of the edge walls 28, oppositely directed recesses 30 are formed, said recesses being formed with abutments 31 for engagement with the spring clip 18 comprising part of a grommet 16.

Each support element at the bend formed between the foot 25 and the wall 26 and at each side edge of said element, is formed with a notch 32. The notches 32 open sidewise as shown best in Fig. 6.

As can be seen from Figs. 1 and 2, the support elements may be assembled on the base 10 by sliding them successively into the channel 23 with the foot 25 of alternate elements directed in the same direction. In this manner, the notches 32 of adjacent elements may interlock so that the walls 26 of adjacent elements assume an overlapping relation and are coextensive laterally, as illustrated. In order to cause said overlapping portions of the walls 26 of the elements to bear against each other to withstand vibration and to afford a firm assembly, the included angle between the foot 25 and the wall 26 of each element is formed somewhat less than a right angle. It will be evident from Fig. 3, that the walls 26 of adjacent elements, press or bear firmly against each other as herein contemplated. It will also be seen that the channel 23 is so formed as to laterally position each support element when engaged with an adjacent element and that the elements, as a group, are firmly seated in said base channel 23. Ready assembly and disassembly is facilitated by the foregoing structure, so that interchange among the support elements is easily accomplished.

The grommets 16 are also made in a variety of sizes to fit the various elements 11 to 15, inclusive. The body 17 of each grommet comprises a circular member formed of a pliable material, such as natural or synthetic rubber. The body 17 is formed with a central opening 35 proportionate to the size of the body and with an edge groove 36 adapted to engage the edge portions of the support element wall 26 which border on the seat 27. The body 17 is preferably molded and when so formed, the clip 18 may be embodied in the structure as an insert, as clearly shown in Figs. 4 and 5.

The clip 18 comprises a strip of flat spring metal having an arcuate middle portion 37 which is embedded in the grommet body 17, and having angularly and oppositely directed protruding ends 38. The middle portion 37 is generally narrow, but the ends 38 widen out as at 39, so that they are wider than the thickness of the support element walls 26 and each may accommodate an end recess 40 defined by the main portion of the end 38 and lateral tongues 41. The ends 38 are so directed as to engage in associated recesses 30 of the support elements.

In the above described manner, a simple unitary grommet is provided which includes means for locking said grommet in position in a fairlead support or like structure. The assembly operation is relatively simple. The grommet is merely slid down into the seat 27 of the support element in which it is being fitted, so that its groove 36 engages the wall 26. Because of the angular disposition of the clip ends 38, they will cam their way past the top edge 29 of the support element and, as downward pressure is continued on the grommet, said clip ends will snap into the recesses 30. The tongues 41 will flank the wall 26, the abutments 31 will engage the bottoms of the recesses 40, and the grommet will be firmly seated.

Removal of a grommet is as easily effected. By pressing the clip ends 38 toward each other, said ends may be displaced from the recesses 30 and the grommet bodily slid from the seat 27.

As a variation of the structure, the tongues 41 may be bent to lie flat against the opposite surfaces of the support element wall 26. This is shown in Fig. 6, wherein the tongues 41ª are shown as bent in the above indicated manner.

In Figs. 1 and 2, only the support elements 12 and 13 are shown as fitted with grommets 16 and it is evident that the remaining elements may be similarly fitted. Fig. 1 shows fairleads F passing through the grommets and it is apparent that these fairleads are effectively supported by the present structure and that interchange may be easily effected.

While we have illustrated and described what we now regard as the preferred embodiments of our invention, the constructions are, of course, subject to modifications without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. A unitary fairlead grommet comprising a circular body having a partial peripheral groove adapted to engage a support for the grommet, and a clip for retaining said grommet on its support, said clip comprising a flat spring member having its middle part embedded in the grommet body and having oppositely and angularly extending clip ends, the latter each having an end recess defined by the main portion of each clip end and flanking tongue portions.

2. A unitary fairlead grommet comprising a circular body having a partial peripheral groove adapted to engage a support for the grommet, and a clip for retaining said grommet in its support, said clip comprising a flat spring member having its middle part embedded in the grommet body and having oppositely and angularly extending clip ends, the latter each having an end recess defined by the main portion of each clip end and flanking tongue portions, said tongue portions being bent transversely to the mentioned clip ends.

MARVIN J. VAVRA.
WILFORD J. BARNETT.

REFERENCES CITED

The following references are of record in the file of this patent:

UNITED STATES PATENTS

| Number | Name | Date |
|---|---|---|
| 1,106,964 | Pahler | Aug. 11, 1914 |
| 1,697,814 | Forbes | Jan. 1, 1929 |
| 2,348,096 | Schack | May 6, 1944 |
| 2,356,318 | Hyman | Aug. 22, 1944 |
| 2,375,513 | Bach | May 8, 1945 |
| 2,383,018 | Shere | Aug. 21, 1945 |
| 2,451,699 | Twaroski | Oct. 19, 1948 |

FOREIGN PATENTS

| Number | Country | Date |
|---|---|---|
| 344,090 | Great Britain | Mar. 5, 1931 |
| 550,936 | Great Britain | Feb. 1, 1943 |
| 560,961 | Great Britain | Apr. 28, 1944 |